Jan. 13, 1942.  E. T. PRICE  2,270,022
MOTOR VEHICLE
Filed Sept. 15, 1939  3 Sheets-Sheet 1
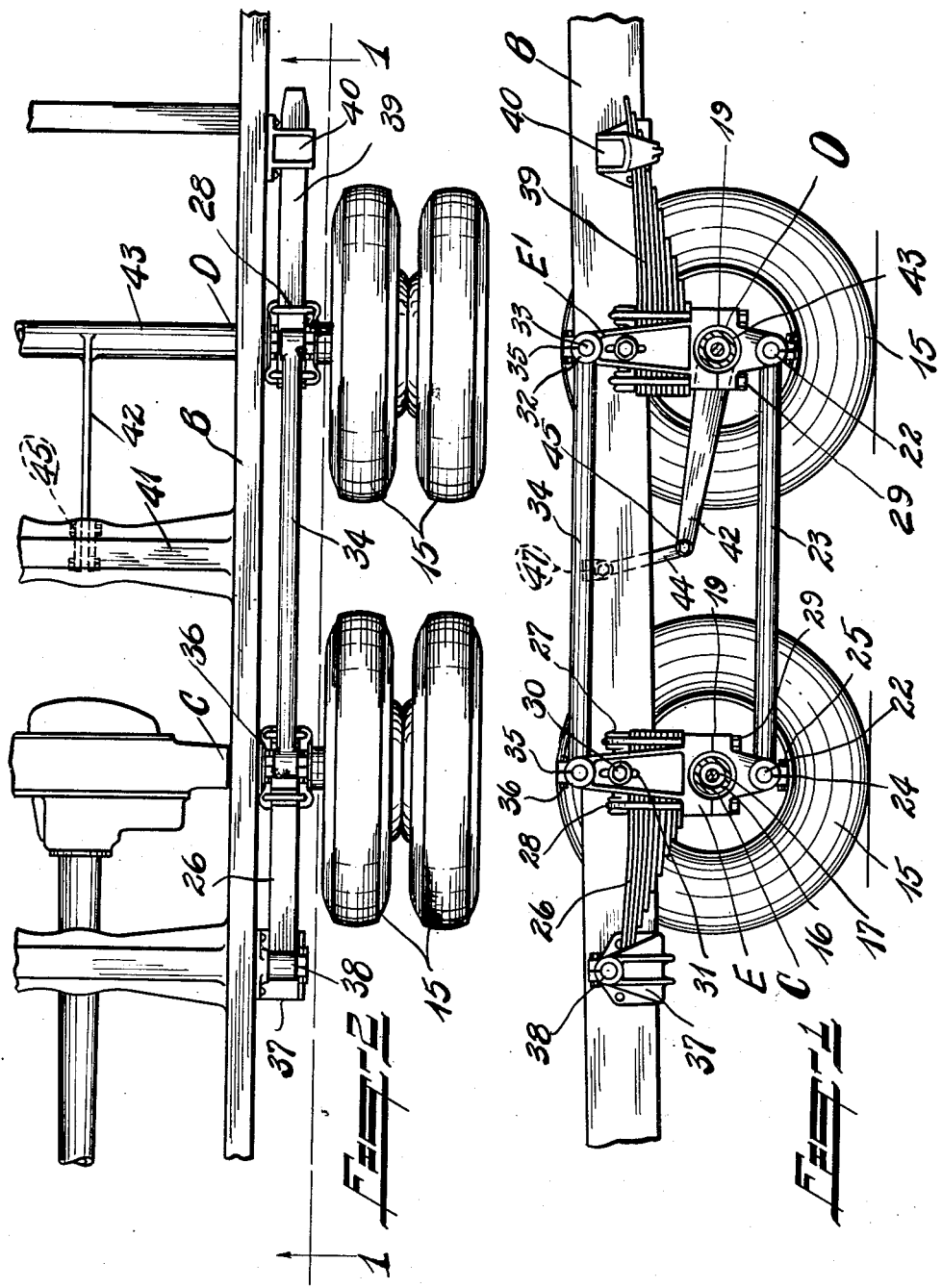
INVENTOR
Edward T. Price.
BY
Frank C. Gorman.
ATTORNEY

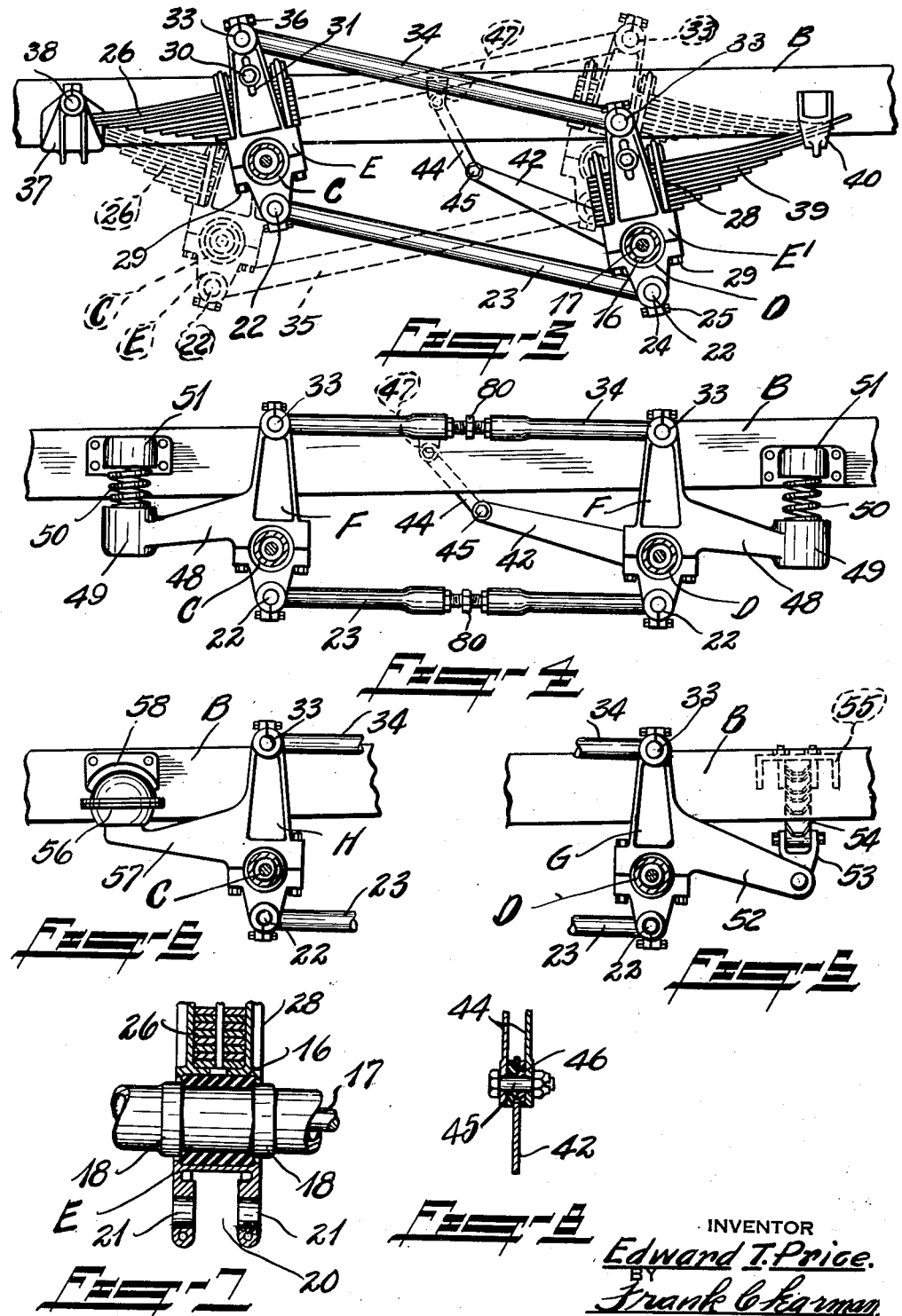

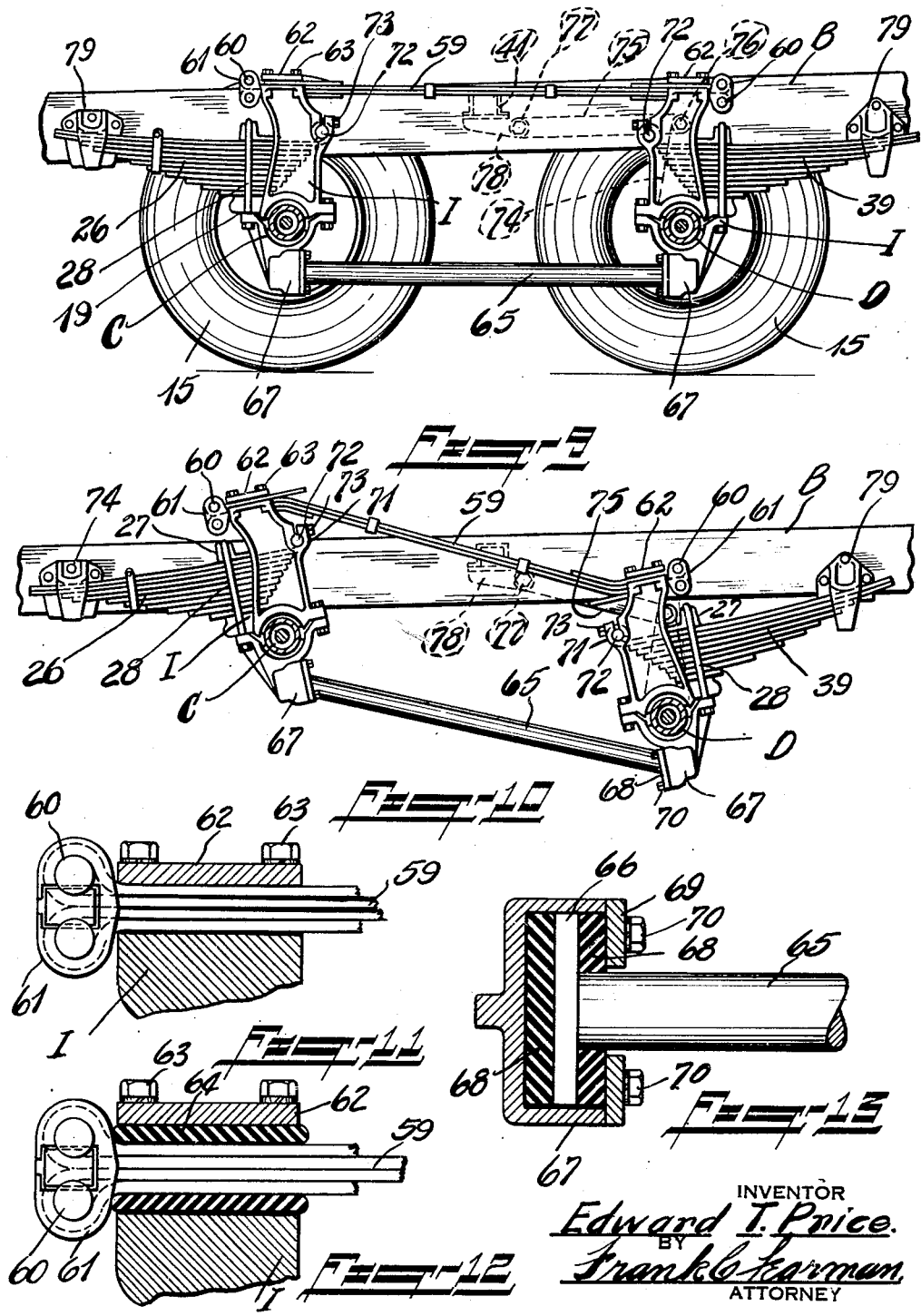

Patented Jan. 13, 1942

2,270,022

UNITED STATES PATENT OFFICE 2,270,022

MOTOR VEHICLE

Edward T. Price, Cadillac, Mich., assignor to Cadillac Malleable Iron Company, Cadillac, Mich.

Application September 15, 1939, Serial No. 295,018

6 Claims. (Cl. 280—124)

This invention relates to cover vehicles, and one of the prime objects of the invention is to design a construction wherein two load carrying axles are arranged in tandem beneath a vehicle frame in such manner that the load is at all times divided between the respective axles according to a predetermined fixed ratio.

Another object of the invention is to provide a vehicle having spaced apart load carrying axles so arranged and connected that each axle is free to assume any position, depending on the topography of the road over which the vehicle is traveling and without bind or twist on any part.

A further object is to provide two load carrying axles arranged in tandem and spaced a fixed distance apart, making it possible to use chains, caterpillar treads, or other devices from wheel to wheel on each side of the vehicle thus increasing traction or flotation.

A still further object is to provide a vehicle construction including two rear axles and in which both axles can be driving axles, dead axles, or in which one axle can be a driving axle and the other a dead axle if desired.

A further object still is to provide a vehicle construction having tandem axles in which the springs function independent of each other, thus providing independent springing of each wheel.

The above and other objects will appear as the specification progresses, reference being had to the accompanying drawings in which I have shown several different embodiments of my invention, but it is to be understood that I do not limit myself to the forms shown, since the invention, as set forth in the claims, may be embodied in a plurality of other forms.

In the drawings:

Fig. 1 is a vertical sectional view of a multi-wheeled truck taken on the line 1—1 of Fig. 2 and showing my parallelogram spring arrangement.

Fig. 2 is a top plan view of a portion of the chassis of a motor vehicle provided with tandem axles embodying my invention.

Fig. 3 is a view similar to Fig. 1 with the wheels omitted and showing the parallelogram spring arrangement in two extreme positions, the full lines showing the rear front wheel raised and the broken lines showing the rear wheels raised.

Fig. 4 is also a fragmentary side elevational view showing a slightly modified spring assembly.

Fig. 5 is a fragmentary view of a structure somewhat similar to Fig. 4 showing a further modified form of spring assembly.

Fig. 6 is also a fragmentary view showing a pneumatic assembly used in place of springs.

Fig. 7 is a vertical sectional view through one of the spring mountings shown in Fig. 3.

Fig. 8 is a transverse sectional view showing the connection of the torque bar to the link.

Fig. 9 is a view similar to Fig. 1 and showing a slightly modified parallel link and torque bar arrangement.

Fig. 10 is a similar view with wheels omitted and the mechanism in extreme tilted position.

Fig. 11 is an enlarged vertical sectional view showing the method of securing the ends of the parallel springs to the brackets.

Fig. 12 is a similar view showing a slightly modified construction.

Fig. 13 is a vertical sectional view showing the method of connecting the lower tie-bar shown in Fig. 10 to the bracket.

Referring now to the drawings in which I have illustrated portions of the longitudinal side frame members B of a motor vehicle and two spaced parallel axle constructions C and D provided at their ends with ground engaging wheels 15 as usual to form a truck.

Brackets E are mounted on these axles C and D and a resilient block 16, preferably formed of rubber, is mounted on the axle shaft 17 between the shoulders 18, (see Fig. 7 of the drawings) permitting each axle to assume varying angular positions in the vertical plane by deforming the block without subjecting the associated parts to binding and strain.

A plain bearing (not shown) may be used in combination with the resilient mounting 16, or a spherical bearing or universal connection may also be used between the brackets E and the axles thus permitting the parallelogram spring arrangement to maintain a substantially vertical plane regardless of the relative angularity of the axles when resting on uneven ground.

The brackets E are split on the center line 19 to facilitate assembly, the lower end being bifurcated as at 20, and terminates in bearings 21 which are adapted to receive a pin 22 for pivotally securing one end of a parallel rod 23 thereto. The lower half of these bearings 21 are split on the line 24, and bolts 25 are provided for retaining the pin 22.

The upper end of the bracket E is also bifurcated to accommodate and form a seat for one end of a leaf spring assembly 26, and a spring block 27 is mounted on said spring, U bolts 28 straddling said block and spring, the ends of the U bolts extending through the body portion of the bracket and having nuts 29 threaded thereon as usual for securing the sections of the bracket in assembled relation. A transversely disposed bolt 30 extends through the upper bifurcated end of the bracket and the spring block respectively to prevent movement or shifting of the spring on the bracket, and vertically disposed slotted openings 31 are provided in the bracket to permit adjustment or accommodate spring assemblies of varying thicknesses.

The upper bifurcated end of the bracket E projects above the spring block 27 and is formed similar to the lower end, terminating in bearings 32 which are adapted to receive the pin 33 for pivotally securing the upper parallel rod 34 thereto, the upper ends of this bearing being split on the line 35, and bolts 36 serve to secure the pin 33 in exactly the same manner as the lower end.

A shackle bracket 37 is secured to the vehicle frame B in any approved manner and a shackle bolt 38 is mounted therein and serves to secure the flexible end of the spring 26 thereto.

The rear bracket E¹ is exactly the same as the front bracket E and the opposite ends of the respective rods 23 and 34 are pivotally connected thereto in an identically similar manner, and a rear spring assembly 39 is mounted thereon in the same manner.

The front spring construction shown in Figs. 1, 2, and 3 is adapted for a vehicle having a semi-torque tube drive, such as shown in the instant application, that is, a torque tube takes the brake and driving torque loads, and the springs take the thrust load.

A spring shackle 40 is provided on the rear end of the frame B as shown, and the flexible end of the rear spring 39 is loosely mounted therein to allow for lateral slippage of said spring.

Suitable bar 42 is welded or otherwise secured to the housing 43 of the axle D, links 44 being pivotally connected to the free end of the torque bar by means of the bolt 45, and resilient washers 46 are provided as shown. The opposite ends of the links 44 are pivotally connected to brackets 47 provided on the cross member 41, said torque bar assembly preventing rotative movement of the axle housing while permitting the axle to raise or lower to follow the topography of the roadway over which the vehicle travels.

Further, one wheel may pass over an elevation throwing one side of the axle upwardly and the connection of the torque bar to the cross member is such that this action can take place without subjecting the parts to binding and severe strains. These brackets, rods, and springs form a parallelogram spring suspension by means of which the load is at all times divided between the axles according to a predetermined fixed ratio, and whereby any one of the springs may function independently of the others, providing for independent springing of each wheel.

The load ratio on the two axles may be changed by altering the position of the brackets 40 on the frame B. Moving the brackets towards the front increases the load on the rear axle and decreases the load on the front rear axle, and likewise moving the brackets towards the rear increases the load on the front rear axle and decreases the load on the rear axle.

In Fig. 4 of the drawings I have shown a slightly modified construction, the bracket F being formed with a laterally projecting arm 48 provided with a spring seat 49 on the end thereof, and a coil spring 50 is seated thereon with its upper end mounted in a bracket 51 which is secured to the vehicle frame. Fig. 5 shows another modification in which the bracket G is also formed with a laterally projecting arm 52, and a shackle 53 is secured to one free end of a transverse spring 54, said spring being securely fixed at its center to a cross member 55 provided on the vehicle frame.

In Fig. 6 of the drawings I have shown still another modification in which a pneumatic or rubber cushion 56 is interposed between the arm 57 provided in the bracket H and the bracket 58 which is secured to the side frame of the vehicle, otherwise the hook-up is exactly the same.

Figs. 9 and 10 show still another modification, in this construction the upper parallel bar 34 is omitted and a spring tie-bar 59 is provided in place of the parallel rod, the ends of the leaves which form the spring tie-bar passing around the pins 60 which are mounted in the member 61 with the ends of the leaves shaped to form a return bend so that the end section rests on the main body of each leaf, these springs are mounted on the upper ends of the brackets I, a cap 62 is provided, and studs 63 serve to secure and clamp the springs in position. To minimize deflection and stress in the spring tie-bar it may be advisable to use resilient blocks 64 such as shown in Fig. 12 of the drawings, thus releasing the tie-bar from deflection load when axles are in extreme position and as indicated in Fig. 10.

The lower rod or tie-bar 65 is also slightly different, the ends having a transversely disposed bar 66 secured thereto, said bar being accommodated in a pocket 67 provided in the lower end of the bracket I, resilient blocks 68 being provided in said pocket, and a plate 69 forms a closure for the open end thereof, and is held in position by studs 70, said plate being centrally bored to accommodate the bar 65 and permit movement of the axles to extreme angular positions without binding.

The spring assemblies are secured in much the same manner as hereinbefore described, excepting that but one U bolt is provided for each spring, and I therefore provide a split bearing 71 on the bracket I and a pin 72 is mounted therein, the top leaf of the spring assembly being secured thereto, thus serving to securely anchor the spring and a bolt 73 is provided to facilitate clamping the pin in position.

The torque bar connection between the axle D and the cross member 41 is substantially the same as shown in Figs. 1 and 2, excepting that the lever 74 projects vertically from the axle housing, links 75 being provided as shown, and bolts 76, and 77 connect the links to the lever and bracket 78 respectively.

This design shown in Figs. 9 and 10, is especially adaptable for vehicles of the full torque tube drive type where the torque tube takes both torque and thrust loads, and the free ends of the springs are mounted in shackle brackets 79 which permit lateral slippage of the springs.

The rubber mountings 16, 64, and 68 permit maximum flexibility without bind or twisting of the parts, and the spring hook-up and arrangement permits the frame to be raised or lowered on one or both sides of the chassis.

The axle spacing may be varied as desired, either by providing paralleled rods of varying lengths, or by providing turn buckles in the rods and as shown at 80 in Fig. 4 of the drawings, such arrangement permits the axle spacing to be changed as desired to adjust the load carrying ratio between the axles, compensate for wear on the bearings, or as a take-up when driving chains are used from wheel to wheel.

Obviously, the hereinbefore described arrangements admits of other modifications without departing from the invention. Therefore, I do not wish to be limited to the precise constructions and arrangements of parts shown and described.

What I claim is:

1. The combination with a parallel link connection between spaced apart rear axles below a vehicle frame; said link connections comprising vertically disposed arms pivotally mounted on the axles at a point intermediate their height; parallel links connecting said arms above and below said axles; a spring suspension means for said axles, said means being anchored to said arms at points above the pivotal connection to the axles and extending in opposite directions forwardly and rearwardly.

2. A device as set forth in claim 1 wherein the vertically disposed arms are in the form of a separate bracket, and a yieldable member surrounding the axles within the brackets and allowing limited rocking movement of the brackets on the axles.

3. The combination with a parallel link connection between adjacent rear axles below a vehicle frame; each link connection including a separable bracket pivotally mounted on its respective axle, and formed with arms extending above and below the axle; parallel links connecting the arms above and below the axles; and resilient means carried by the upwardly extending arms of said brackets and extending in opposite directions forwardly and rearwardly, for resiliently supporting said frame on said axles.

4. The combination as set forth in claim 3 including means carried by the parallel links for varying the length thereof and imparting a flexing action on the resilient means in either direction when the axles assume varying angular positions with relation to each other while maintaining them in substantially parallel relation.

5. The combination with a parallel link connection between adjacent axles below a vehicle frame, said link connection comprising arms extending upwardly above the axles; arms extending downwardly below the axles; parallel links connecting the arms above and below the axles; and spring suspension means associated with said upwardly extending arms and extending in opposite directions forwardly and rearwardly, one set of springs having their outer ends pivotally connected to the vehicle frame, with the other set of springs having a floating connection therewith.

6. The combination with a parallel link connection between adjacent axles below a vehicle frame, said link connection comprising arms extending upwardly above the axles; arms extending downwardly below the axles; parallel links connecting the arms above and below the axles; and spring suspension means associated with said upwardly extending arms and extending in opposite directions forwardly and rearwardly, said spring means having their outer ends connected to the vehicle frame, a forwardly extending torque bar carried by one of the axles, and a link connection between said bar and the vehicle frame.

EDWARD T. PRICE.